United States Patent [19]
Sato

[11] Patent Number: 6,167,208
[45] Date of Patent: Dec. 26, 2000

[54] CAMERA HAVING DATA PROCESSOR ENABLING EXTERNAL PROCESSING OF IMAGE DATA

[75] Inventor: Koichi Sato, Saitama, Japan

[73] Assignee: Asahi Kogaku Kogyo Kabushiki Kaisha, Tokyo, Japan

[21] Appl. No.: 09/182,226

[22] Filed: Oct. 30, 1998

[30] Foreign Application Priority Data

Nov. 5, 1997 [JP] Japan ............................... P09-319074

[51] Int. Cl.[7] ........................... G03B 17/00; G03B 29/00
[52] U.S. Cl. ....................... 396/532; 396/300; 396/429; 348/207; 348/552; 358/909.1
[58] Field of Search ................... 396/529–532, 396/429, 661, 300; 348/552, 207, 233; 358/906, 909.1

[56] References Cited

U.S. PATENT DOCUMENTS

| | | | |
|---|---|---|---|
| 4,603,955 | 8/1986 | Haneishi | 396/532 |
| 5,166,717 | 11/1992 | Kawasaki et al. | 396/63 |
| 5,170,200 | 12/1992 | Kawasaki et al. | 396/133 |
| 5,181,060 | 1/1993 | Kawasaki et al. | 396/165 |
| 5,182,591 | 1/1993 | Kawasaki et al. | 396/63 |
| 5,223,877 | 6/1993 | Kawasaki et al. | 396/87 |
| 5,255,046 | 10/1993 | Kawasaki et al. | 396/87 |
| 5,283,663 | 2/1994 | Kawasaki et al. | 358/426 |
| 5,365,350 | 11/1994 | Kawasaki et al. | 358/426 |
| 5,455,650 | 10/1995 | Fujiwara | 396/71 |
| 5,631,700 | 5/1997 | Sato | 348/222 |
| 5,708,472 | 1/1998 | Morisawa et al. | 348/373 |
| 5,808,675 | 9/1998 | Yamamoto | 348/294 |
| 5,857,125 | 1/1999 | Morisawa | 396/429 |
| 5,895,127 | 4/1999 | Yamamoto | 396/300 |

Primary Examiner—David M. Gray
Attorney, Agent, or Firm—Greenblum & Bernstein, P.L.C.

[57] ABSTRACT

A data transfer device comprises a camera body provided with a lens mount, to which an interchangeable lens can be attached, and a printer having a connector. The lens mount is attached to the connector, so that the camera body is connected to the printer. A lens control pin provided on the lens mount is electrically connected to a data transfer pin provided on the connector. Image data obtained by a photographing operation of the camera is transferred to the printer through the lens control pin and the data transfer pin.

18 Claims, 8 Drawing Sheets

CAMERA HAVING DATA PROCESSOR ENABLING EXTERNAL PROCESSING OF IMAGE DATA

BACKGROUND OF THE INVENTION

1. Field of the Invention

The present invention relates to a digital camera, and more particularly to a device by which image data, obtained by the digital camera, is inputted to an external device such as a printer.

2. Description of the Related Art

Conventionally, there is known a construction in which image data, obtained by a digital camera, is transferred to an external device, such as a printer, through a cable. In this construction, a connector, through which the image data is outputted from the camera, is provided, and the cable is connected to the connector. On the other hand, there is known a digital camera, in which a lens mount is provided on the camera body so that an interchangeable lens can be detachably mounted on the camera body, similarly to a silver halide camera.

In the construction in which the image data is transferred to the external device through the cable, however, the connector should be provided on an outer surface of the camera body, which makes the structure of the camera body complex, and as such, the camera body must be carefully handled.

SUMMARY OF THE INVENTION

Therefore, an object of the present invention is to provide a data transfer device, having a simple construction enabling the camera to be handled with ease, by which image data is transferred to an external device.

According to the present invention, there is provided a data transfer device provided on a camera, comprising a lens mount and a data transfer processor. The lens mount is provided on a camera body to enable attachment of an interchangeable lens. The data transfer processor transfers image data, which is obtained by a photographing operation of the camera, to an external device through the lens mount. The external device is connectable to the camera body.

Further, according to the present invention, there is provided a data transfer device provided on a digital camera, comprising a lens mount and a data transfer processor. The lens mount is provided on a camera body to enable attachment of an interchangeable lens. The data transfer processor transfers image data, which is obtained by a photographing operation of the digital camera, to an external device connectable to the lens mount.

Furthermore, according to the present invention, there is provided a data transfer device provided on a digital camera, comprising an image memory, a lens mount and a data transfer processor. The image memory is provided in the digital camera to store digital image data. The lens mount is provided on a camera body to enable attachment of an interchangeable lens. The data transfer processor transfers the digital image data, stored in the digital camera, to an external device connectable to the lens mount.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to embodiments shown in the drawings.

Figure 1:
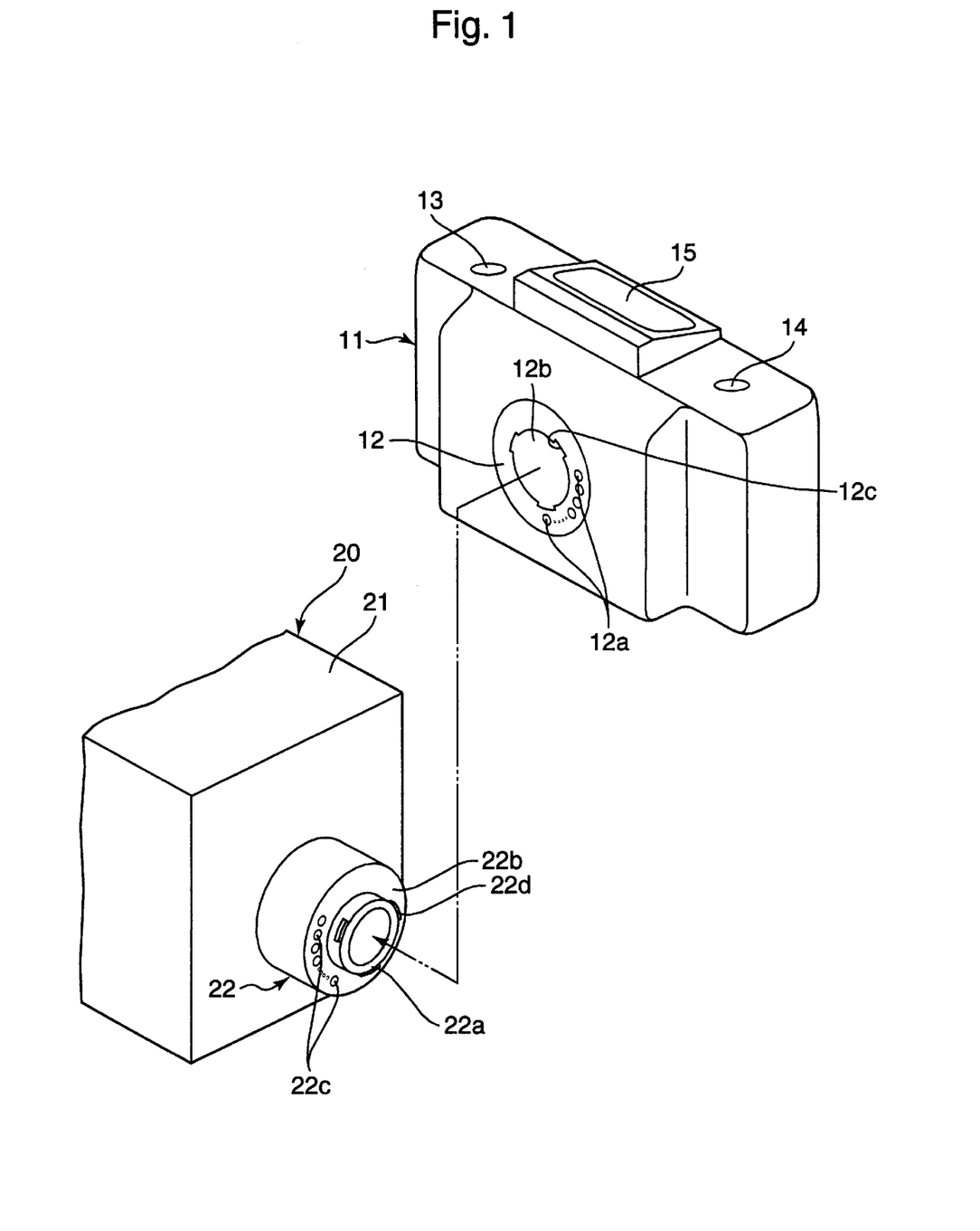
FIG. 1 is a disassembled perspective view of a digital camera, to which a first embodiment of the present invention is applied, and a printer.

FIG. 1 is a perspective view showing a digital camera, to which a first embodiment of the present invention is applied, and a printer. In the drawing, the digital camera and the printer are disassembled.

A lens mount 12 is provided on a front surface of a camera body 11 in order to allow attachment of an interchangeable lens (not shown) thereto. The lens mount 12 is an annular member having three notches 12c on an inner peripheral edge thereof and a plurality of lens control pins 12a, circumferentially arranged thereon. The lens control pins 12a are provided for performing a data communication between the camera body 11 and the interchangeable lens, and are also used for transferring image data, obtained by a photographing operation, to a printer 20.

A release switch 13 and a mode setting switch 14 are provided on an upper surface of the camera body 11. The release switch 13 is used as a data transfer switch, by which the image data is transferred to the printer 20, in addition to carrying out a shutter release. A liquid crystal display 15 is disposed between the switches 13 and 14 to indicate information, such as a number of frames which can be photographed by the digital camera.

The printer 20 is an ink-jet type color printer, for example, which can print a color image obtained by the digital camera. A cylindrical connector 22, to which the lens mount 12 can be connected, is disposed on a side surface of a housing 21 of the printer 20.

The connector 22 is rotatable about the axis thereof, relative to the housing 21. The connector 22 has a projection 22a, which can be inserted into an opening 12b of the lens mount 12, and an annular step 22b formed around the projection 22a. Data pins 22c, which are electrically connected to the lens control pins 12a, are provided on the step 22b. Three engaging claws 22d, which correspond to the notches 12c of the lens mount 12, are formed on an outer surface of the projection 22a.

Thus, the construction of the connector 22 is basically the same as that of a mount of the interchangeable lens (not shown). Namely, similar to an operation in which an interchangeable lens is attached to the lens mount 12, the lens mount 12 is engaged with the projection 22a of the connector 22 in such a manner that the engaging claws 22d are inserted into the notches 12c. The connector 22 is then rotated by a predetermined degree, so that the camera body 11 and the printer 20 are securely interconnected to each other.

Figure 2:
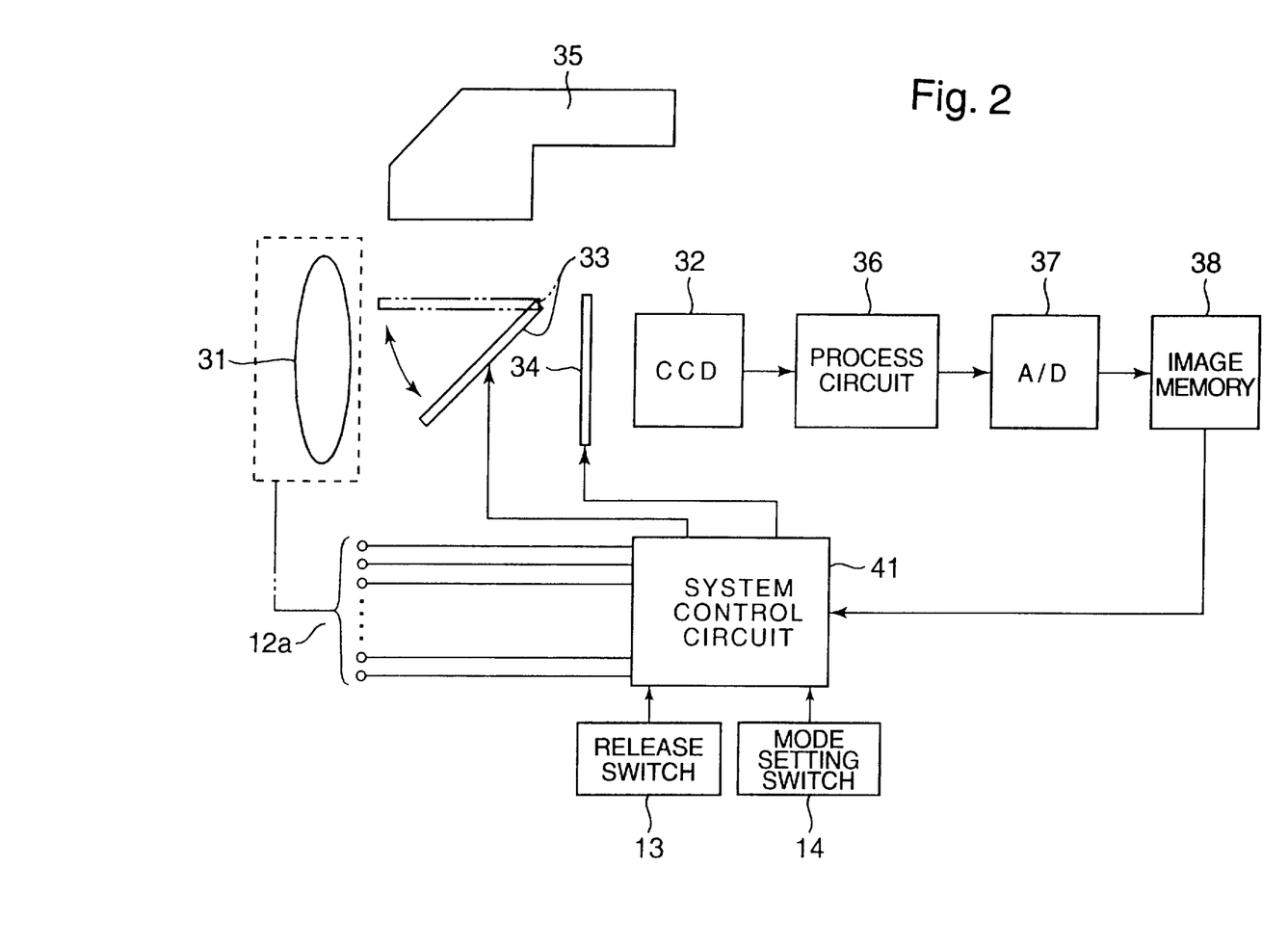
FIG. 2 is a block diagram showing an electric circuit provided in the digital camera.

FIG. 2 is a block diagram showing an electric circuit provide din the digital camera shown in FIG. 1.

When a photographing lens (i.e., an interchangeable lens) 31 is attached to a lens mount (not shown), an imaging device (i.e., CCD) 32 is positioned behind the photographing lens 31, and a quick return mirror 33 and a shutter 34 are positioned between the photographing lens 31 and the imaging device 32. A view finder optical system 35 is provided above the quick return mirror 33.

The quick return mirror 33 and the shutter 34 are driven by a system control circuit 41. Namely, the quick return mirror 33 is usually inclined as shown by a solid line, so that a light beam passing through the photographing lens 31 is led to the view finder optical system 35, and thus an object to be photographed can be observed through the view finder optical system 35. Conversely, when the release switch 13 is depressed in a photographing mode, the quick return mirror 33 is rotated to a horizontal position as shown by a double-chained line, and the shutter 34 is opened for a predetermined period. Due to this operation, a light beam passing through the photographing lens 31 is led to the imaging device 32, so that an object image is formed on a light receiving surface of the imaging device 32. Image data corresponding to the object image is thus generated and outputted by the imaging device 32 to the process circuit 36.

In the process circuit 36, the image data is subjected to a correlated double sampling (CDS), an auto gain control (AGC), a shading correction, a gamma correction and so on, and then is converted to a digital signal by an A/D converter 37, before being stored in an image memory 38 as digital image data.

The release switch 13 and the mode setting switch 14 are connected to the system control circuit 41. The operation mode of the digital camera is changed between the photographing mode and a data transfer mode by the mode setting switch 14. When the photographing mode is set, the image data is stored in the image memory 38 by pressing the release switch 13, as described above. When the data transfer mode is set, the release switch 13 is operated as a data transfer switch. Namely, at this time, by pressing the release switch 13, the image data stored in the image memory 38 is read by the system control circuit 41, and is outputted form the digital camera through the lens control pins 12a.

Figure 3:
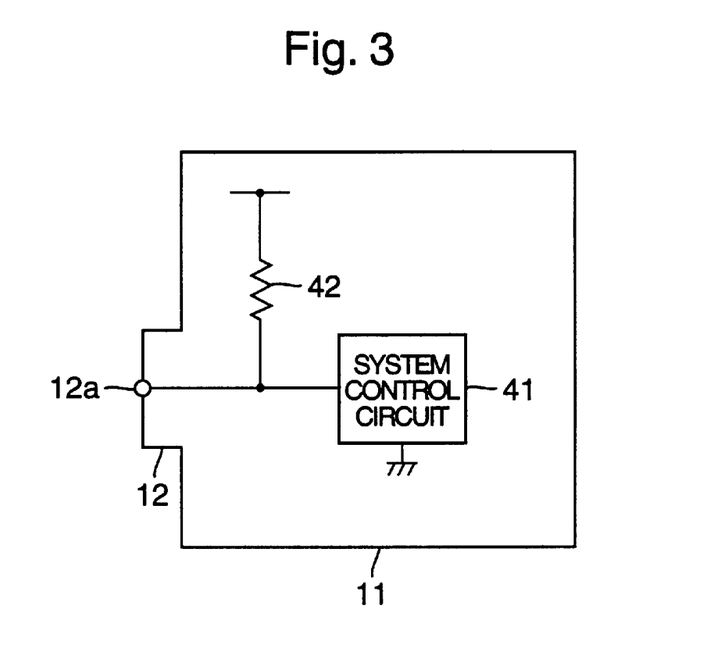
FIG. 3 is a block diagram showing a state in which nothing is connected to a lens mount of the digital camera.
Figure 4:
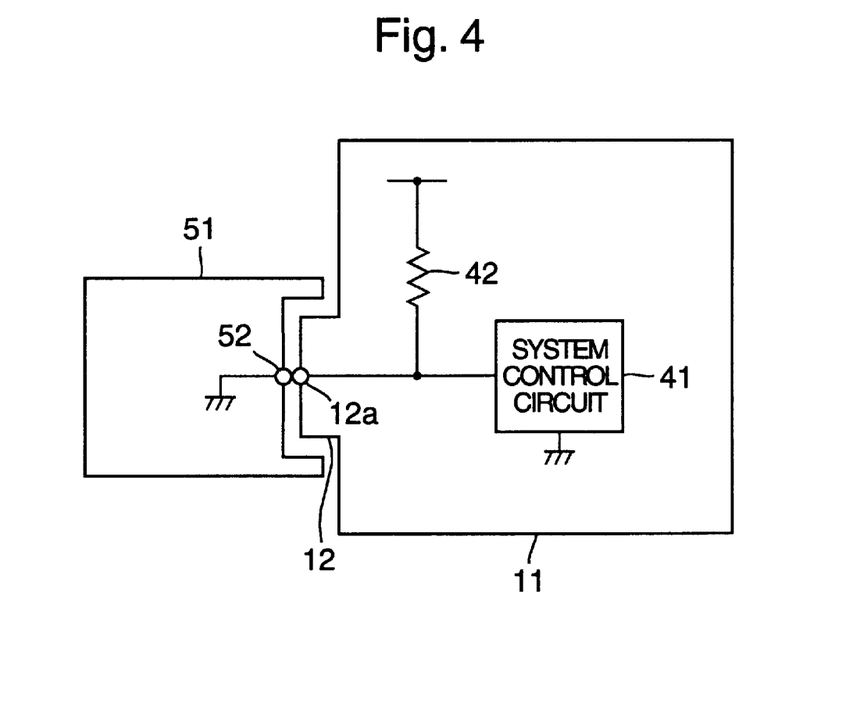
FIG. 4 is a block diagram showing a state in which an interchangeable lens is connected to the lens mount.
Figure 5:
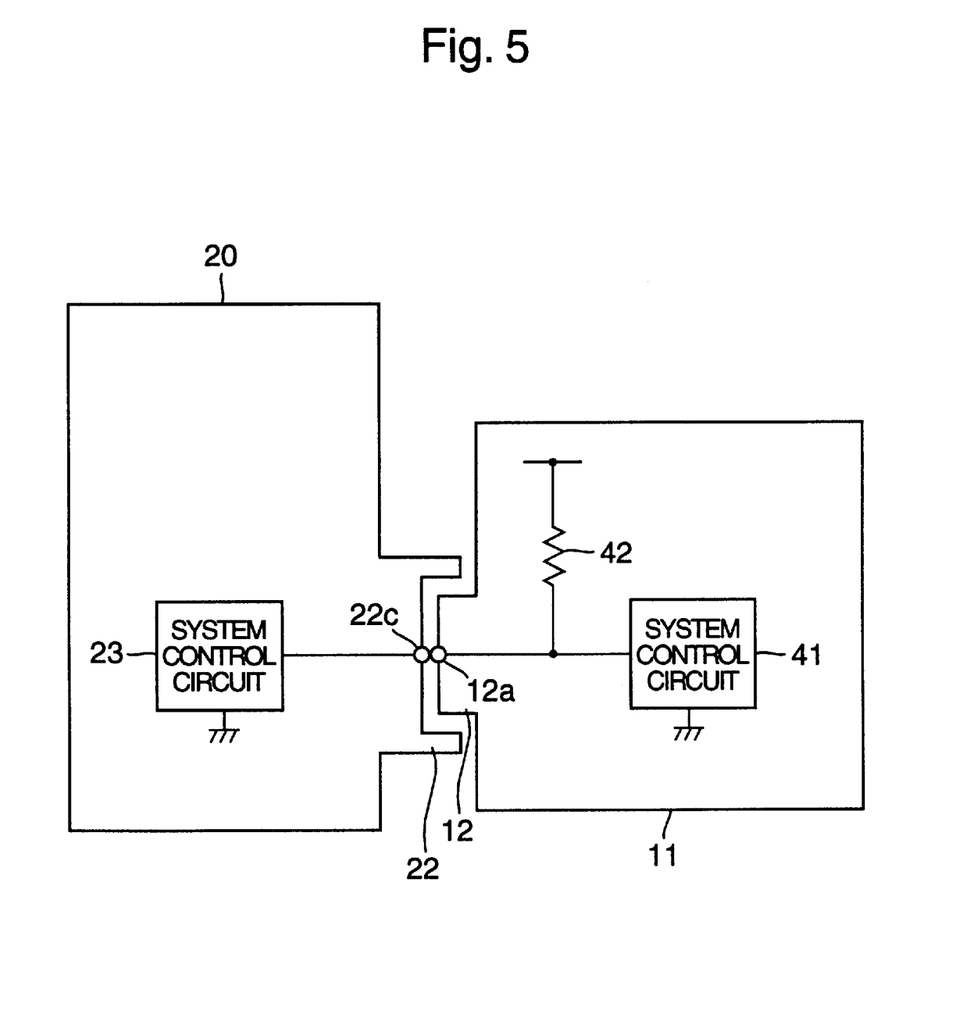
FIG. 5 is a block diagram showing a state in which the printer is connected to the lens mount.

FIGS. 3 through 5 show connecting states in which each interchangeable device is connected to the camera body 11.

FIG. 3 shows a state in which nothing is connected to the lens mount 12 of the camera body 11. A connected device recognition signal, indicating whether an interchangeable lens, an external device (i.e., the printer 20) or nothing is connected to the camera body 11, is inputted to the system control circuit 41 through one of the lens control pins 12a. In the camera body 11, a pull-up resistor 42 is provided between one of the lens control pins 12a and the system control circuit 41. Therefore, when nothing is connected to the lens mount 12, a high voltage signal, which is the connected device recognition signal, is inputted to the system control circuit 41.

FIG. 4 shows a state in which an interchangeable lens 51 is connected to the lens mount 12. A grounded data communication pin 52, which contacts one of the lens control pins 12a provided in the lens mount 12, is disposed on the interchangeable lens 51. Therefore, when the interchangeable lens 51 is connected to the lens mount 12, a low voltage signal, which is the connected device recognition signal, is inputted to a predetermined terminal of the system control circuit 41 through the lens control pin 12a and the data communication pin 52.

The interchangeable lens 51 is provided with other data transfer pins (not shown), through which lens information of the interchangeable lens 51 is transferred from the lens 51 to the camera body 11. Further, information, such as a fully-open aperture value used for carrying out an exposure control and an auto focus control, is transferred from the camera body 11 to the interchangeable lens 51.

FIG. 5 shows a state in which the printer 20 is connected to the lens mount 12. Data transfer pins 22c (only one shown) and a system control circuit 23 are provided in the printer 20, and the data transfer pins 22c are connected to the system control circuit 23. When the printer 20 is connected to the lens mount 12, one of the data transfer pins 22c is in contact with one of the lens control pins 12a provided on the lens mount 12. In this state, the connected device recognition signal, in which a high voltage signal and a low voltage signal alternately appear with a predetermined period, for example, is inputted to the system control circuit 41 in the camera body 11 through the lens control pin 12a and the data transfer pin 22c, due to an operation of the system control circuit 23 in the printer 20.

Figure 6:
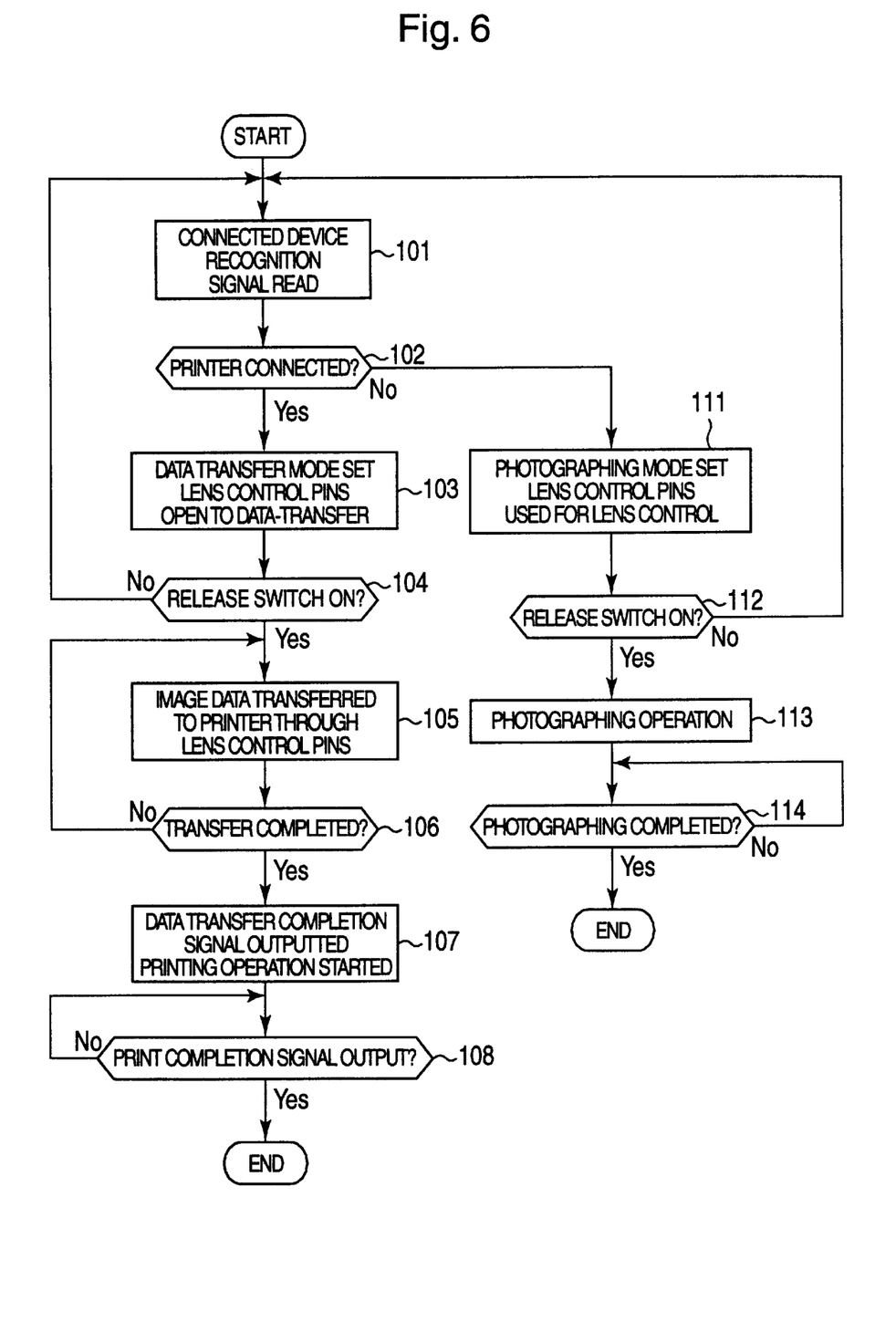
FIG. 6 is a flowchart of a program, by which a printing operation of the printer is performed and a photographing operation of the digital camera is performed.

FIG. 6 is a flowchart of a program, by which a printing operation of the printer 20 is performed and a photographing operation of the digital camera is performed.

In Step 101, the connected device recognition signal, which is inputted through one of the lens control pins 12a, is read. In Step 102, it is determined, based on the connected device recognition signal, whether the printer 20 is connected to the camera body 11. When the printer 20 is connected, i.e. when the connected device recognition signal, in which the high voltage signal and the low voltage signal alternately appear with a predetermined period, is inputted, Step 103 and the subsequent Steps are executed so that image data is transferred from the camera body 11 to the printer 20 enabling an image to be printed.

In Step 103, the operation mode is set to the data transfer mode (i.e. print mode), and a predetermined number of lens control pins 12a provided in the lens mount 12 become activated enabling data transfer to occur. Thus, for example, one of the lens control pins 12a is used for transferring the image data, while the other lens control pins 12a are used for transferring information, which allows the transfer of the image data to take place.

In Step 104, it is determined whether the release switch 13 is depressed. While the release switch 13 is not depressed, Steps 101 through 104 are repeatedly executed. Conversely, when the release switch 13 is depressed, the process goes from Step 104 to Step 105, so that transferral of the image data is started. Namely, the release switch 13 is used in the data transfer mode as the data transfer switch by which a transfer operation of the image data is started.

In Step 105, the image data is read from the image memory 38 provided in the camera body 11, and transferred to the printer 20 through the lens control pins 12a. In Step 106, it is determined whether the transfer of the image data has been completed. This determination is performed by reading data indicating an end mark provided at the end of the image data.

The transfer of the image data is carried out until the completion of the transfer is confirmed in Step 106. When the completion of the transfer is confirmed, Step 107 is executed in which a data transfer completion signal is outputted, and the execution of a printing is commanded, so that a printing operation of an image is started. In Step 108, it is determined whether the printing operation has been completed. This determination is performed by detecting a print completion signal outputted from the printer 20. When the printing operation has been completed, this program ends.

When it is determined in Step 102 that the printer 20 is not connected to the camera body 11, i.e. when the high voltage signal or the low voltage signal only is inputted to the system control circuit 41 of the camera body 11, Step 111 and the subsequent Steps are executed so that a photographing operation is carried out by the digital camera.

In Step 111, the operation mode is set to the photographing mode, so that all of the lens control pins 12a provided on the lens mount 12 are set to a condition under which the lens control pins 12a are used for controlling the photographing lens 31. As a result, a lens communication function, a control of the lens function and so on become active between the interchangeable lens 51 and the camera body 11.

In Step 112, it is determined whether the release switch 13 is depressed. While the release switch 13 is not depressed, Steps 101, 102, 111 and 112 are repeatedly executed. Conversely, when the release switch 13 is depressed, the process goes from Step 112 to Step 113, so that a photographing operation is performed. Namely, a usual photographing sequence is performed, in which a photographing operation is carried out in accordance with an aperture value and a shutter speed. In Step 114, it is determined whether the photographing sequence has been completed. This determination is carried out by detecting a closing operation, for example, in which the shutter 34 is closed. When the photographing sequence has been completed, the program ends.

Note that, ad described above, when the connected device recognition signal, which is the high voltage signal, is detected by the system control circuit 41, Steps 111 through 114 are executed. Accordingly, even when an unrecognized interchangeable lens, in which a lens communication function is unable to come on-line as normal, is attached, a photographing operation can still be performed manually.

As described above, the embodiment is constructed in such a manner that the lens mount 12 provided on the camera body 11 is directly connected to the connector 22 of the printer 20, and therefore, a cable for transferring image data to the printer 20 is unnecessary. Consequently, it is unnecessary to provide a connector on an outer surface of the camera body 11, so that a structure of the camera body 11 becomes simple. Namely, it is not necessary to handle the camera, during a photographing operation, more delicately than usual as an easily-damaged connector is no longer separately provided on the camera body 11.

Further, in the embodiment, the connector 22 of the printer 20 has the same construction as that of a mount of an interchangeable lens. Therefore, in manufacturing the connector 22, parts common to the interchangeable lens can be utilized, so that an increase in the manufacturing cost is restricted.

Figure 7:
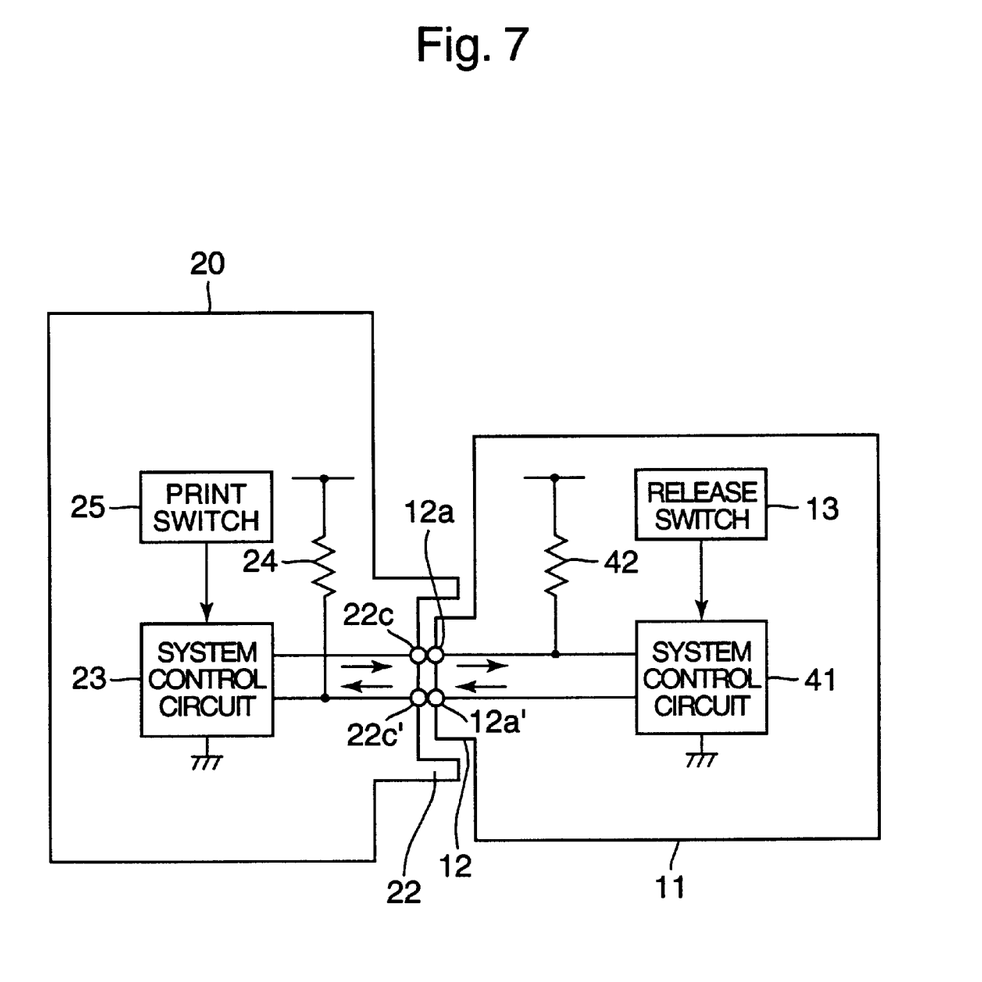
FIG. 7 is a block diagram of a second embodiment showing a state in which the printer is connected to the camera body.

FIG. 7 shows a state in which the printer 20 is connected to the camera body 11, in a second embodiment. In this embodiment, first and second lens control pins 12a and 12a' provided on the lens mount 12 of the camera body 11 and first and second data transfer pins 22c and 22c' provided on the connector 22 of the printer 20 are electrically connected to each other, so that two-way communication is performed between the camera body 11 and the printer 20.

In the camera body 11, the first and second lens control pins 12a and 12a' are connected to the system control circuit 41, and a pull-up resistor 42 is provided between the first lens control pin 12a and the system control circuit 41. Therefore, when the camera body 11 is connected to the connector 22 of the printer 20, the connected device recognition signal, in which a high voltage signal and a low voltage signal alternately appear with a predetermined period, is inputted to a predetermined terminal of the system control circuit 41 through the first lens control pin 12a due to an operation of the system control circuit 23. Conversely, when the camera body 11 and the printer 20 are not connected to each other, the connected device recognition signal, which is a continuous high voltage signal, is inputted to the system control circuit 41.

In the printer 20, the first and second data transfer pins 22c and 22c' are connected to the system control circuit 23, and a pull-up resistor 24 is provided between the second data transfer pin 22c' and the system control circuit 23. Therefore, when the camera body 11 is connected to the connector 22 of the printer 20, the connected device recognition signal, in which a high voltage signal and a low voltage signal alternately appear with a predetermined period, is inputted to a predetermined terminal of the system control circuit 23 through the second lens control pin 22c' due to an operation of the system control circuit 41. Conversely, when the camera body 11 and the printer 20 are not connected to each other, the connected device recognition signal, which is a continuous high voltage signal, is inputted to the system control circuit 23. A print switch 25, which is operated when performing a print operation, is connected to the system control circuit 23.

The other constructions are the same as those of the first embodiment.

Figure 8:
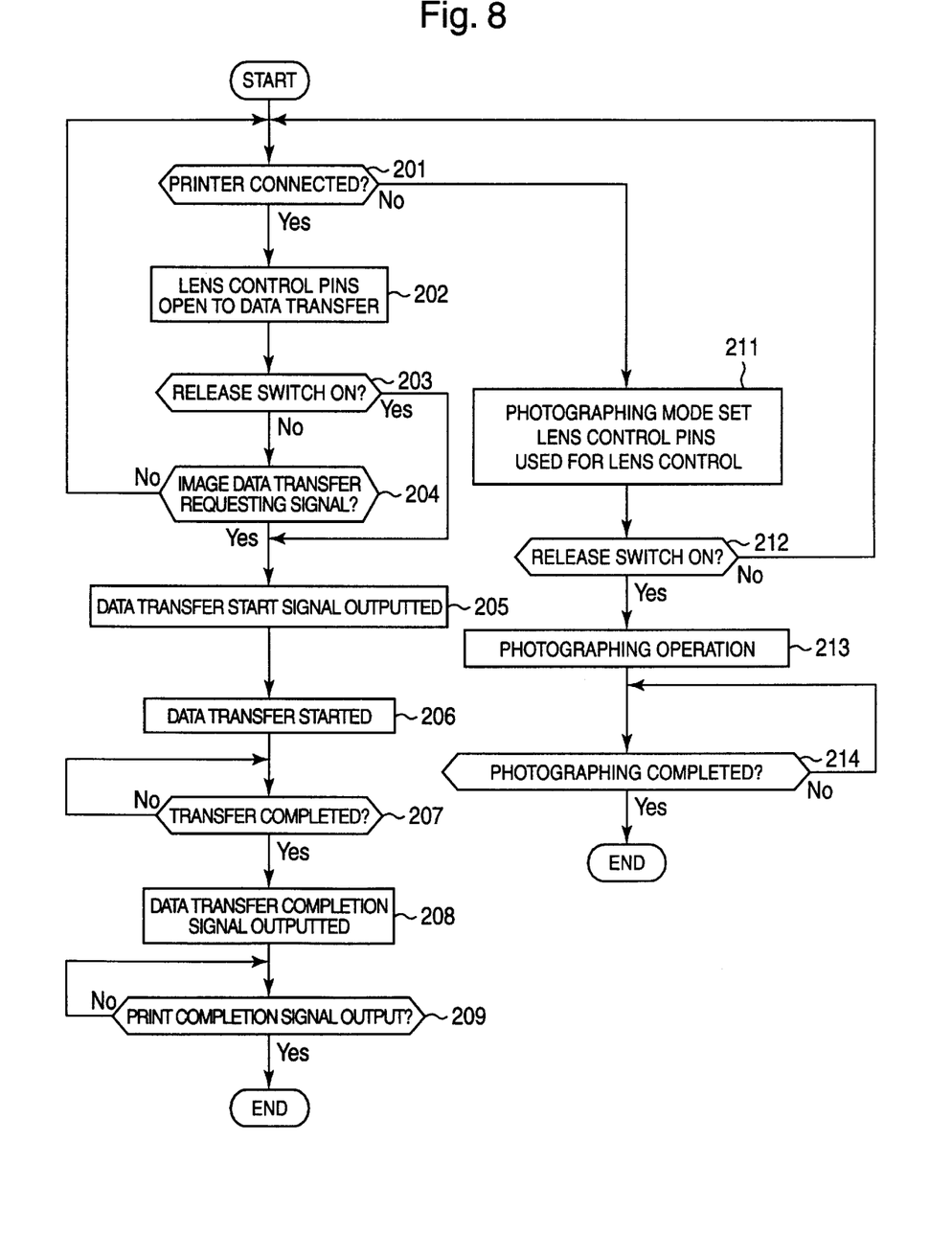
FIG. 8 is a flowchart of a program, which is executed by a system control circuit provided in the camera body, to control an operation of the digital camera in the second embodiment.

FIG. 8 is a flowchart of a program, which is executed by the system control circuit 41 provided in the camera body 11, to control an operation of the digital camera.

In Step 201, it is determined, based on the connected device recognition signal inputted through the first lens control pin 12a, whether the printer 20 is connected to the camera body 11. When the printer 20 is connected, an image is printed in Steps 202 through 209, and when the printer 20 is not connected, a usual photographing operation is performed in Steps 211 through 214.

In Step 202, the lens control pins 12a and 12a' become activated enabling image data transfer to occur. In Step 203, it is determined whether the release switch 13 is depressed. While the release switch 13 is not depressed, it is determined in Step 204 whether a signal indicating that a request for an image data transferral to the printer 20 has been inputted from the printer 20. When the image data transfer requesting signal has not been inputted, the process returns to Step 201, and thus the operations described above are repeated.

When it is determined in Step 203 that the release switch 13 is depressed, or when it is determined in Step 204 that the image data transfer requesting signal has been inputted from the printer 20, Step 205 is executed in which a transfer of the image data is started. Namely, the release switch 13 is operated as the data transfer switch for starting the transfer operation of the image data.

In Step 205, a data transfer start signal is outputted to inform the printer 20 that the transfer of the image data is started. In Step 206, the image data transfer is started, so that the image data is read from an image memory provided in the camera body 11, and transferred to the printer 20 through the second lens control pin 12a'. The image data transfer is continued until the completion of the transfer is confirmed in Step 207. The confirmation of the completion of the image data transfer is carried out by reading an end mark data provided at the end of the image data, for example.

When it is confirmed in Step 207 that the image data transfer has been completed, Step 208 is executed in which an image data transfer completion signal is outputted to the printer 20. In Step 209, it is determined whether a print completion signal has been inputted from the printer 20. When it is confirmed in Step 209 that the print completion signal has been inputted, this program ends.

Conversely, when it is determined in Step 201 that the printer 20 is not connected to the camera body 11, Step 211 is executed. Namely, the operation mode is set to the photographing mode, so that all of the lens control pins 12a and 12a' provided on the lens mount 12 are set to a condition under which the lens control pins 12a and 12a' are used for controlling the photographing lens 31. As a result, a lens communication function, a control of the lens function and so on come on-line between the interchangeable lens 51 and the camera body 11.

In Step 212, it is determined whether the release switch 13 is depressed. While the release switch 13 is not depressed, Steps 201, 211 and 212 are repeatedly executed. Conversely, when the release switch 13 is depressed, the process goes from Step 212 to Step 213, so that a photographing operation is performed. Namely, as described with reference to FIG. 6, a usual photographing sequence is performed. When it is confirmed in Step 214 that the photographing sequence has been completed, the program ends.

Figure 9:
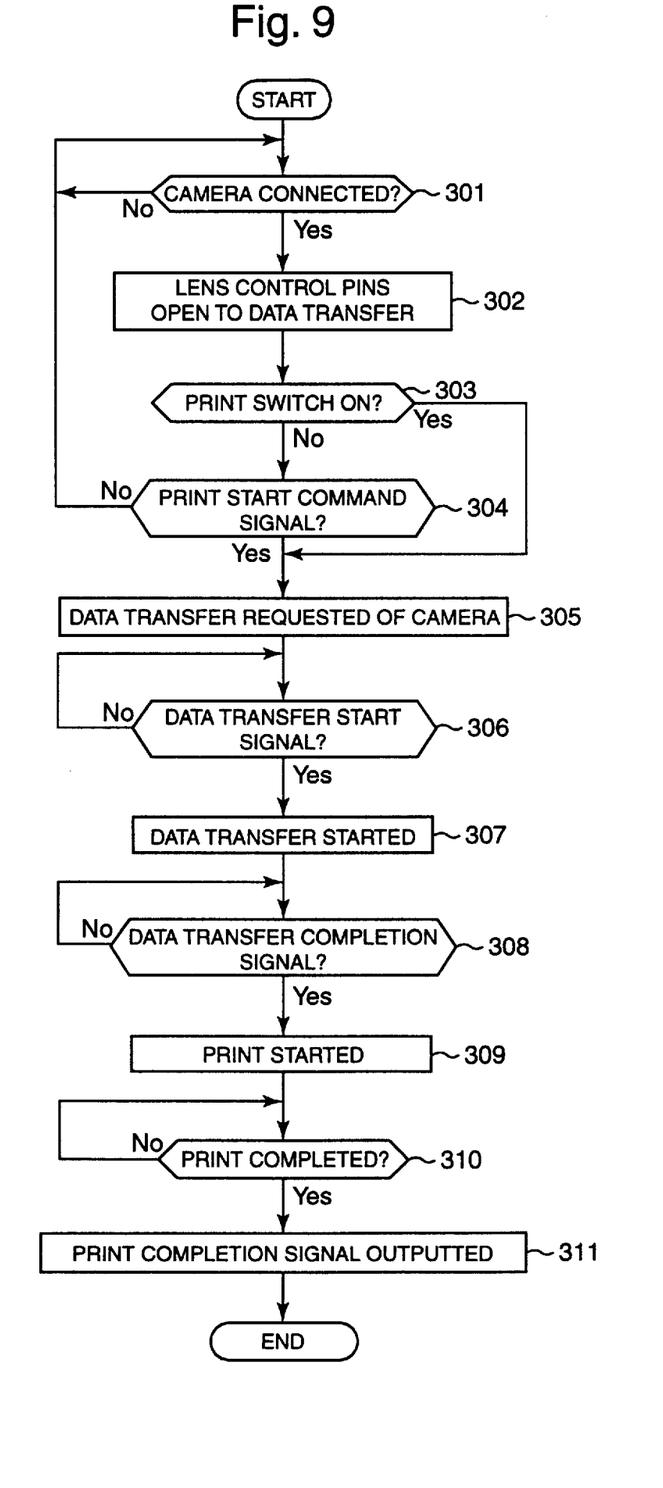
FIG. 9 is a flowchart of a program, which is executed by a system control circuit provided in the printer, to control an operation of the printer.

FIG. 9 is a flowchart of a program, which is executed by the system control circuit 23 provided in the printer 20, to control an operation of the printer 20.

In Step 301, it is determined, based on the connected device recognition signal inputted to the printer 20 through the second data transfer pin 22c', whether the camera body 11 is connected to the printer 20. When the camera body 11 is not connected, Step 301 is repeatedly executed. Conversely, when the camera body 11 is connected, Step 302 is executed.

In Step 302, a data transferal is requested by the system control circuit 41 of the camera body 11, so that the lens control pins 12a and 12a' provided in the camera body 11 come on-line for use in transferring the image data. In Step 303, it is determined whether the print switch 25 is depressed. When the print switch 25 is not depressed, Step 304 is executed in which it is determined whether a print start command signal has been inputted from the camera body 11. The print start command signal is outputted by depressing the release switch 13. When the print start command signal has not been inputted, the process goes back to Step 301, and thus the operations described above are repeated.

When it is determined in Step 303 that the print switch 25 is depressed, or when it is determined in Step 304 that the print start command signal has been inputted, Step 305 is executed in which a request for a transfer of the image data is outputted to the digital camera. Then, when it is confirmed in Step 306 that a data transfer start signal has been inputted from the digital camera, the transfer of the image data is started in Step 307. Namely, the image data is transferred from the digital camera to the printer 20 through the second data transfer pin 22c'. The transfer of the image data is executed until it is confirmed in Step 308 that the transfer has been completed. The confirmation of the completion of the transfer is carried out by detecting a data transfer completion signal outputted by the digital camera.

When it is confirmed in Step 308 that the transfer of the image data has been completed, a printing of an image is started in Step 309. The printing of the image is performed until completion is confirmed in Step 310. The confirmation of the completion of the printing is carried out by reading end mark data provided at the end of the image data, for example. When completion of the printing is confirmed, the print completion signal is outputted to the digital camera, and this program ends.

As described above, the second embodiment is constructed in such a manner that the lens mount 12 of the camera body 11 is directly connected to the connector 22 of the printer 20, and therefore similar effects to those of the first embodiment are obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-319074 (filed on Nov. 5, 1997) which is expressly incorporated herein, by reference, in its entirety.

What is claimed is:

1. A data transfer device that transfers image data from a camera to a printer, said data transfer device comprising:
   a lens mount provided on a camera body that enables attachment of an interchangeable lens, said lens mount having an annular opening; and
   a data transfer processor that transfers image data, obtained by a photographing operation of said camera, to said printer through said lens mount, said printer including a connector having an annular projection, said printer being directly connectable to said camera body by engagement of said annular opening of said lens mount of said camera body with said annular projection of said printer, said printer printing an image in accordance with said image data input by said connector.

2. A data transfer device according to claim 1, wherein said lens mount comprises a control member that controls data communication performed between said camera body and said printer, so that said image data is transferred to said printer through said control member.

3. A data transfer device according to claim 2, wherein a signal, indicating that one of said interchangeable lens and said printer is attached to said camera body, is inputted to said camera body through said control member.

4. A data transfer device according to claim 1, wherein said lens mount comprises a control member that controls data communication performed between said camera body and said printer, and said printer comprises a data transfer member which is electrically connected to said control member.

5. A data transfer device according to claim 4, wherein a signal, indicating that said camera body is attached to said printer, is inputted to said external device through said data transfer member.

6. A data transfer device according to claim 1, the printer and the interchangeable lens being selectively usable with the camera body by being mounted to said lens mount of the camera body.

7. The data transfer device according to claim 1, wherein at least one notch is provided in a periphery of said annular opening and at least one claw is provided in an outer periphery of said annular projection, and wherein said camera body is directly connectable to said printer by insertion of said annular projection into said annular opening of said lens mount when said at least one engaging claw is aligned with said at least one notch, and said connector is rotated.

8. A data transfer device that transfers image data from a digital camera to a printer, said data transfer device comprising:

a lens mount provided on a camera body that enables attachment of an interchangeable lens, said lens mount having an annular opening; and a data transfer processor that transfers image data, obtained by a photographing operation of said digital camera, to said printer through said lens mount, said printer including a connector having an annular projection, said printer being directly connectable to said lens mount by engagement of said annular opening of said lens mount of said camera body with said annular projection of said printer, said printer prints an image in accordance with said image data input by said connector.

9. The data transfer device according to claim 8, wherein at least one notch is provided in a periphery of said annular opening and at least one claw is provided in an outer periphery of said annular projection, and wherein said camera body is directly connectable to said printer by insertion of said annular projection into said annular opening of said lens mount when said at least one engaging claw is aligned with said at least one notch, and said connector is rotated.

10. A data transfer device transferring digital image data from a digital camera to a printer, said data transfer device comprising:

an image memory provided in said digital camera that stores digital image data;

a lens mount provided on a camera body that enables attachment of an interchangeable lens, said lens mount having an annular opening; and a data transfer processor that transfers said digital image data, store din said image memory of said digital camera, to said printer through said lens mount, said printer including a connector having an annular projection, said printer being directly connectable to said lens mount by engagement of said annular opening of said lens mount of said camera body with said annular projection of said printer, said printer printing an image in accordance with said digital image data input by said connector.

11. The data transfer device according to claim 10, wherein at least one notch is provided in a periphery of said annular opening and at least one claw is provided in an outer periphery of said annular projection, and wherein said camera body is directly connectable to said printer by insertion of said annular projection into said annular opening of said lens mount when said at least one engaging claw is aligned with said at least one notch, and said connector is rotated.

12. A camera system that transfers image data to a printer, said camera system comprising:

a camera body, said camera body having a lens mount that enables attachment of an interchangeable lens, said lens mount having an annular opening;

an interchangeable lens attachable to said camera body; and a data transfer processor that transfers image data, obtained by a photographing operation of said camera, to said printer through said lens mount, said printer including a connector having an annular projection, said printer being directly connectable to said camera body by engagement of said annular opening of said lens mount of said camera body with said annular projection of said printer, said printer printing an image in accordance with the image data;

said camera system having a photographing mode wherein said interchangeable lens is mounted to said camera body and a photographing operation is performed to obtain image data of an object, said camera system also having an image forming mode in which said printer is connected to said camera body, and image data is transferred to said printer through said lens mount.

13. The camera system according to claim 12, wherein said lens mount comprises a control member that controls data communication between said camera body and the printers, so that said image data is transferred to said printer through said control member.

14. The camera system according to claim 13, wherein a signal, indicating that one of said interchangeable lens and the printer is attached to said camera body, is input to said camera body through said control member.

15. The camera system according to claim 12, said lens mount comprising a control member that controls data communication between said camera body and the printer, the printer comprising a data transfer member which is electrically connected to said control member.

16. The camera system according to claim 15, wherein a signal, indicating that the printer is attached to said camera body, is input to the external device through said data transfer member.

17. The data transfer device according to claim 12, wherein at least one notch is provided in a periphery of said annular opening and at least one claw is provided in an outer periphery of said annular projection, and wherein said camera body is directly connectable to said printer by insertion of said annular projection into said annular opening of said lens mount when said at least one engaging claw is aligned with said at least one notch, and said connector is rotated.

18. The camera system according to claim 12, wherein the camera body further comprises a single release switch, and wherein a photographing operation is performed in response to depression of the single release switch while in the photographing mode, and the image data is transferred to the printer in response to the depression of the single release switch while in the image forming mode.

* * * * *